United States Patent
Romero

(10) Patent No.: US 9,687,083 B1
(45) Date of Patent: Jun. 27, 2017

(54) CHILD TRANSPORTATION ACCESSORY

(71) Applicant: Atlantic Scientific Consulting Corp., Miami, FL (US)

(72) Inventor: Juan Romero, Sunrise, FL (US)

(73) Assignee: Atlantic Scientific Consulting Corp., Miami, FL (US)

( * ) Notice: Subject to any disclaimer, the term of this patent is extended or adjusted under 35 U.S.C. 154(b) by 13 days.

(21) Appl. No.: 14/872,941

(22) Filed: Oct. 1, 2015

(51) Int. Cl.
*A47D 13/02* (2006.01)
*A61G 7/10* (2006.01)

(52) U.S. Cl.
CPC .......... *A47D 13/025* (2013.01); *A61G 7/1023* (2013.01)

(58) Field of Classification Search
CPC ........ A47D 13/02; A47D 13/025; A61G 1/01; A61G 7/10; A61G 7/1023; A61G 7/1038
USPC ............... 224/157–161; 5/625–628; 294/140
See application file for complete search history.

(56) References Cited

U.S. PATENT DOCUMENTS

| | | | | |
|---|---|---|---|---|
| 2,804,249 A * | 8/1957 | Manalo | .................. | A47D 13/02 224/158 |
| 4,944,057 A * | 7/1990 | Shaw | .................. | A61G 7/1023 224/159 |
| 5,978,989 A * | 11/1999 | Chavez | .................. | A61G 1/01 294/140 |
| 6,926,359 B2 | 8/2005 | Runk | | |
| 8,793,827 B1 * | 8/2014 | Smart | .................. | A61G 1/044 128/870 |
| 2008/0313812 A1* | 12/2008 | Reeves | .................. | A47D 13/02 5/655 |
| 2012/0018466 A1* | 1/2012 | Topaz | .................. | A61G 1/01 224/158 |
| 2015/0265066 A1* | 9/2015 | Krass | .................. | A47D 13/02 224/158 |
| 2016/0095446 A1* | 4/2016 | Dellinger, Jr. | ......... | A47D 13/02 224/158 |

FOREIGN PATENT DOCUMENTS

FR        1414479 A  * 10/1965  ............... A61G 1/01

* cited by examiner

*Primary Examiner* — Nathan J Newhouse
*Assistant Examiner* — Phillip Schmidt
(74) *Attorney, Agent, or Firm* — Christian Sanchelin

(57) ABSTRACT

A child car seat accessory removably mounted to a car seat or stroller using a plurality of straps that cooperate together to serve as carrying straps and to securely envelope a child during transportation between a stroller and a child car seat, or vice versa. The accessory includes padding where a child is positioned to enhance the child's comfort and is made of a lightweight flexible material that makes it easy to store and use. The accessory can be rolled into a compact configuration to provide an ergonomic means to store and transport the present invention.

12 Claims, 6 Drawing Sheets

# US 9,687,083 B1

CHILD TRANSPORTATION ACCESSORY

BACKGROUND OF THE INVENTION

1. Field of the Invention

The present invention relates to a car seat accessory and, more particularly, to a portable car seat accessory used to comfortably secure children to a car seat and readily transport them from the seat to a stroller.

2. Description of the Related Art

Several designs for car seat accessories have been designed in the past. None of them, however, include straps that cooperate with each other to envelope a child and transport him or her from the car seat to a stroller or other carrying device.

Applicant believes that a related reference corresponds to U.S. Pat. No. 6,926,359 issued to Graco Children's Products, Inc. for a child seat cover. However, it differs from the present invention because the Graco reference does not teach or motivate one of ordinary skill in the art to use a plurality of looped straps to cooperatively mount to a child's car seat while simultaneously being used as ergonomic handles to transport a child between a child car seat and a stroller. Also, the present invention includes a top strap at its top distal end to secure it to the headrest of a vehicle.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a car seat accessory that can be removably mounted to a car seat so a user can easily remove it and it to transport a child from a car seat to a stroller, and vice-versa.

It is another object of this invention to provide a such an accessory that is securely mounted to a car seat using a plurality of security and mounting straps on both sides and top of the accessory.

It is another object of the present invention to provide a plurality of straps to secure a child while providing elasticity necessary to make transportation easy for the user and child.

It is still another object of the present invention to provide an accessory that includes padding to enhance a child's comfort.

It is another object of the present invention to provide an accessory that secures a child to a car seat.

It is yet another object of this invention to provide such an accessory that is inexpensive to implement and maintain while retaining its effectiveness.

It is another object of the present invention to provide an accessory that can be rolled up into a compact configuration for storage.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is a representation of a front view of a child positioned on the present invention while using a stroller. In this view the child has been secured using female and male restraining members 46; 46a, top transportation restraining members 61; 61a, and bottom transportation restraining members 63; 63a.

DETAILED DESCRIPTION OF THE EMBODIMENTS OF THE INVENTION

Figure 1:
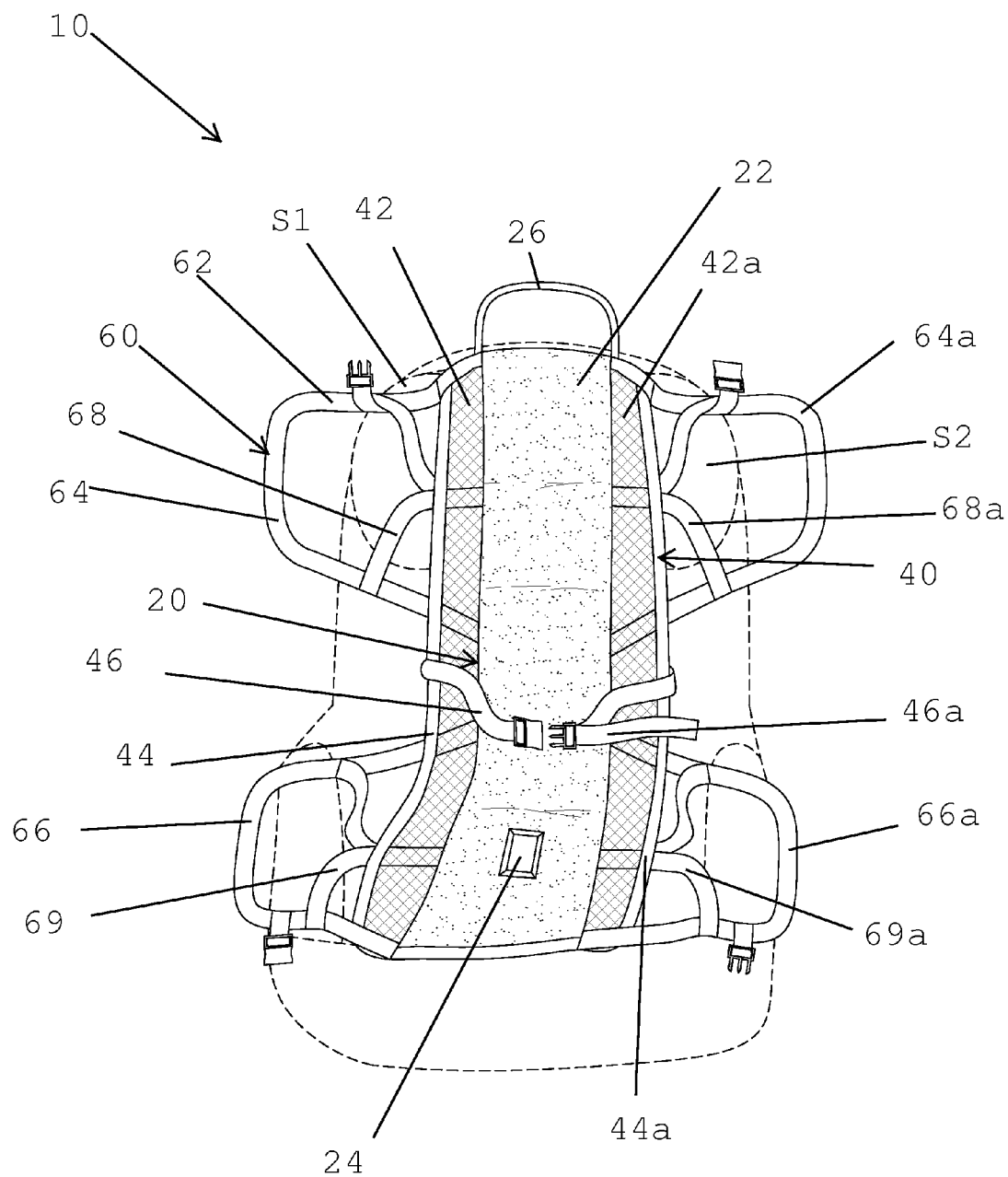
FIG. 1 represents a front view of the present invention in its operating environment mounted to a child's car seat.

Referring now to the drawings, where the present invention is generally referred to with numeral 10, it can be observed that it basically includes pad assembly 20, enveloping assembly 40, carrying strap assembly 60, and storage assembly 100.

Figure 1A:
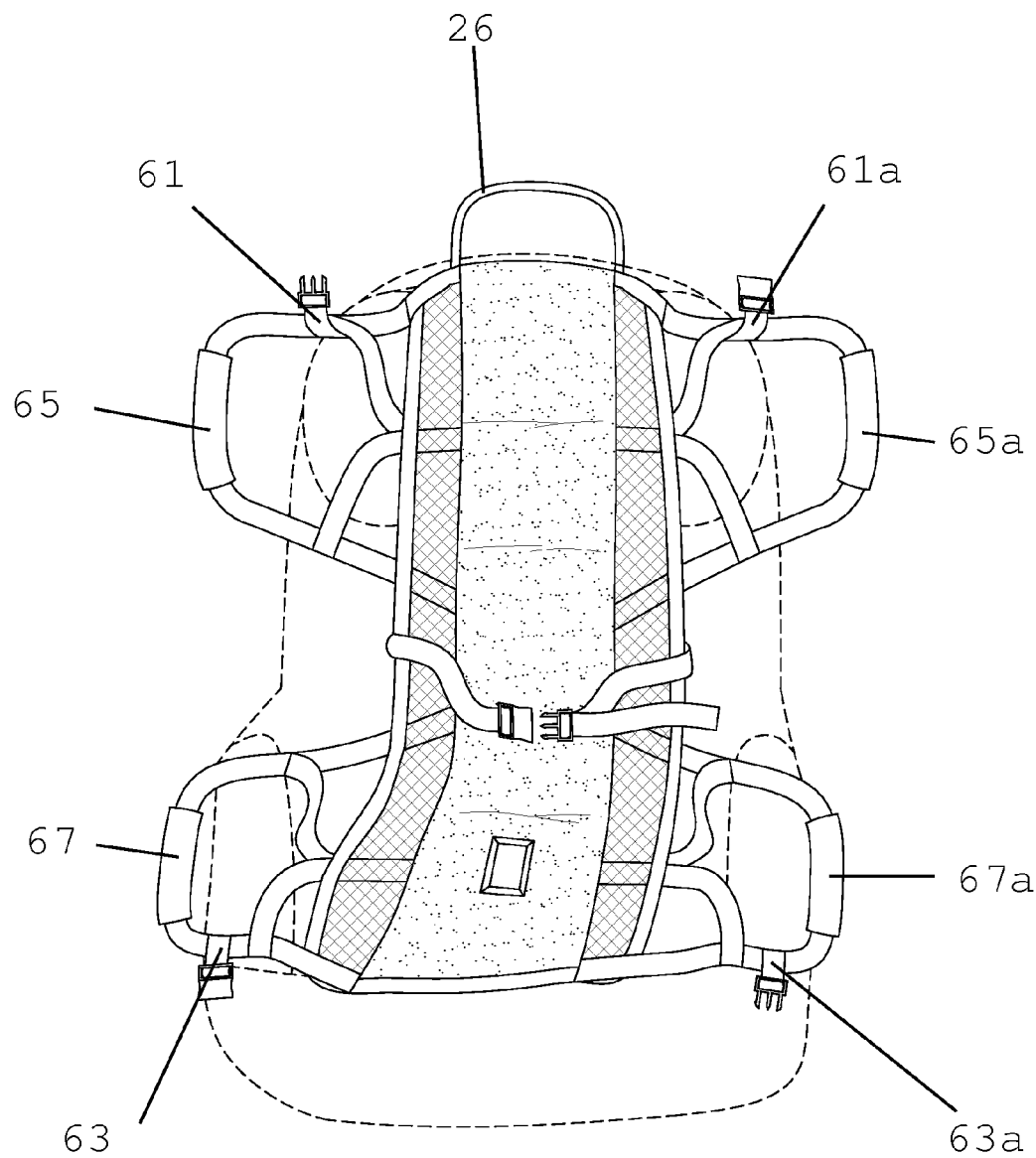
FIG. 1A represents a front view of an alternate embodiment of the present invention wherein top cushions 65; 65a and bottom cushions 67; 67a are mounted to top loops 64; 64a and bottom loops 66; 66a, respectively.

As seen in FIGS. 1-1A, pad assembly 20 includes cushioned pad 22 that extends longitudinally along the length of the present invention whereon a child can be positioned. The top of cushioned pad 22 is placed flush against the back rest or a car seat or stroller and its bottom portion is flush against the child car seat in a vehicle or stroller. Pad assembly 20 further includes seat belt opening 24 at its bottom portion to allow a car's seat belt buckle to pass through and the present invention to be comfortably positioned on the child's car seat. Optionally, as shown in FIGS. 1-5, pad assembly 20 can include headrest mounting member 26 that can be used to secure the present invention when transporting the child between the child car seat and stroller and vice versa.

As shown in FIGS. 1-1A, enveloping assembly 40 includes first and second enveloping flaps 42; 42a, respectively, that continuously extend outwardly from the sides of cushioned pad 22. In one embodiment, first and second enveloping flaps 42; 42a can be made of a flexible mesh material. The outer edge of first and second enveloping flaps 42; 42a are lined by perimeter members 44; 44a, respectively. As shown in FIGS. 1-1A, enveloping assembly 40 further includes female restraining member 46 and male restraining member 46a extending from the midpoint of perimeter members 44; 44a, respectively. In an alternate embodiment, female restraining member 46 and male restraining member 46a can be inverted. A baby or young child would be positioned along cushioned pad 22 and secured into place using female restraining member 46 and male restraining member 46a, which can be adjusted depending on the child's dimensions.

In a preferred embodiment, carrying strap assembly 60 includes a continuous strap 62 that is mounted in a figure eight configuration behind pad assembly 20 and enveloping assembly 40. Four loops are created when continuous strap 62 is mounted in this configuration. Top loops 64; 64a extend outwardly from the top portions of enveloping flaps 42; 42a and can cooperate with each other to be used as carrying straps when transporting the child in the invention. When the present invention is positioned against a child car seat top loops 64; 64a are mounted around child car seat head support members S1 and S2, respectively. This further anchors the present invention to the child's car seat. Carrying strap assembly 60 includes bottom loops 66; 66a that extend from the bottom portions of enveloping flaps 42; 42a, respectively. In an alternate embodiment, continuous strap 62 can be segmented into different portions that accomplish the same function.

As shown in FIGS. 1-1A, carrying strap assembly 60 also includes top elastic band members 68; 68a that each are mounted to and extend from the rear, top portion of pad assembly 20 at one end and mount to the top and bottom of top loops 64; 64a at a second end. Carrying strap assembly 60 further includes bottom elastic band members 69; 69a that are mounted to and extend from the rear, bottom portion of pad assembly 20. Top and bottom elastic band members 68; 68a and 69; 69a, respectively, are each mounted a predetermined location along perimeter members 44; 44a between the top and bottom of their respective loop member. For instance, top elastic band member 68 is mounted to pad assembly 20 then extends outward and is mounted at a point along perimeter member 44 that is between the top and bottom of top loop 64.

Figure 2:
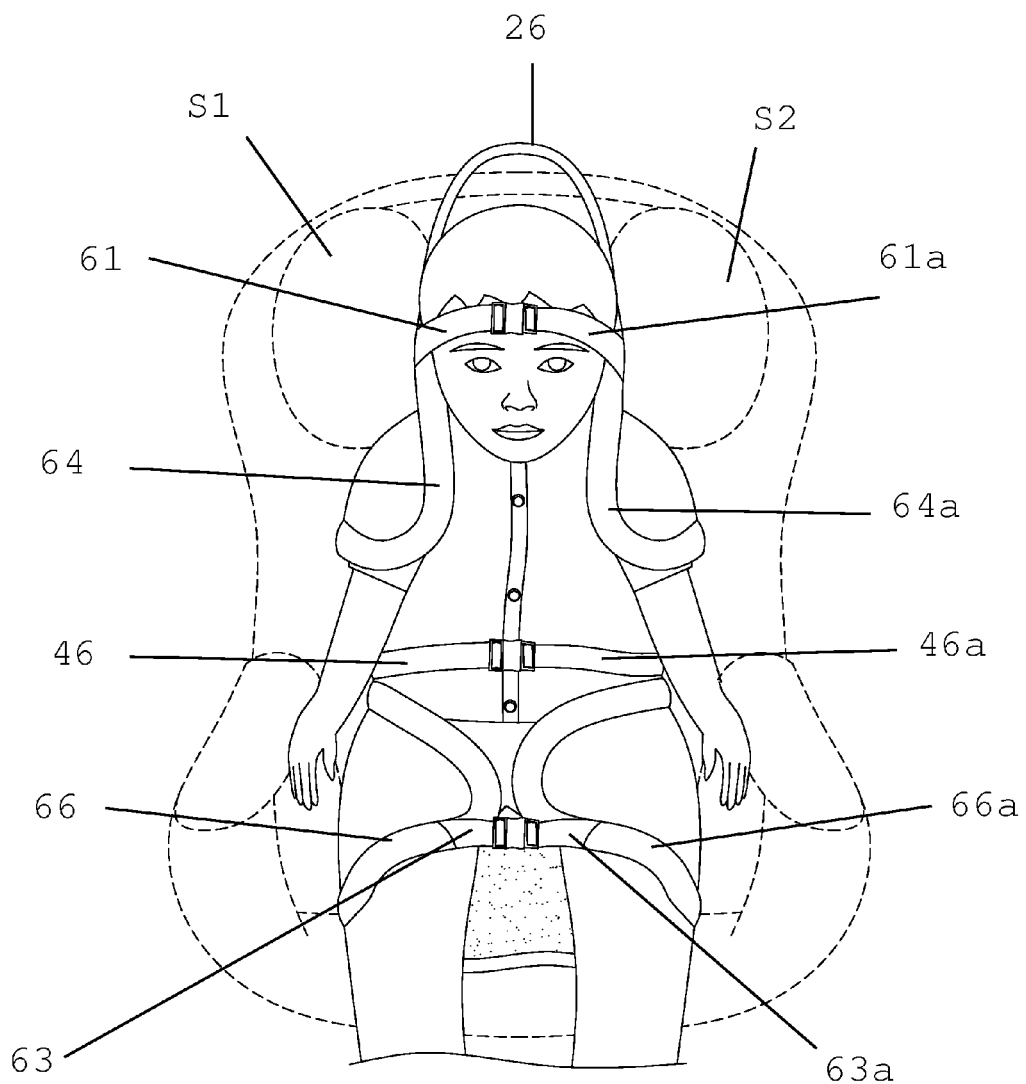
FIG. 2 shows a front view of the present invention wherein top transportation restraining members 61; 61a and bottom transportation restraining members 63; 63a are connected and a child is secured and ready for transportation.
Figure 3:
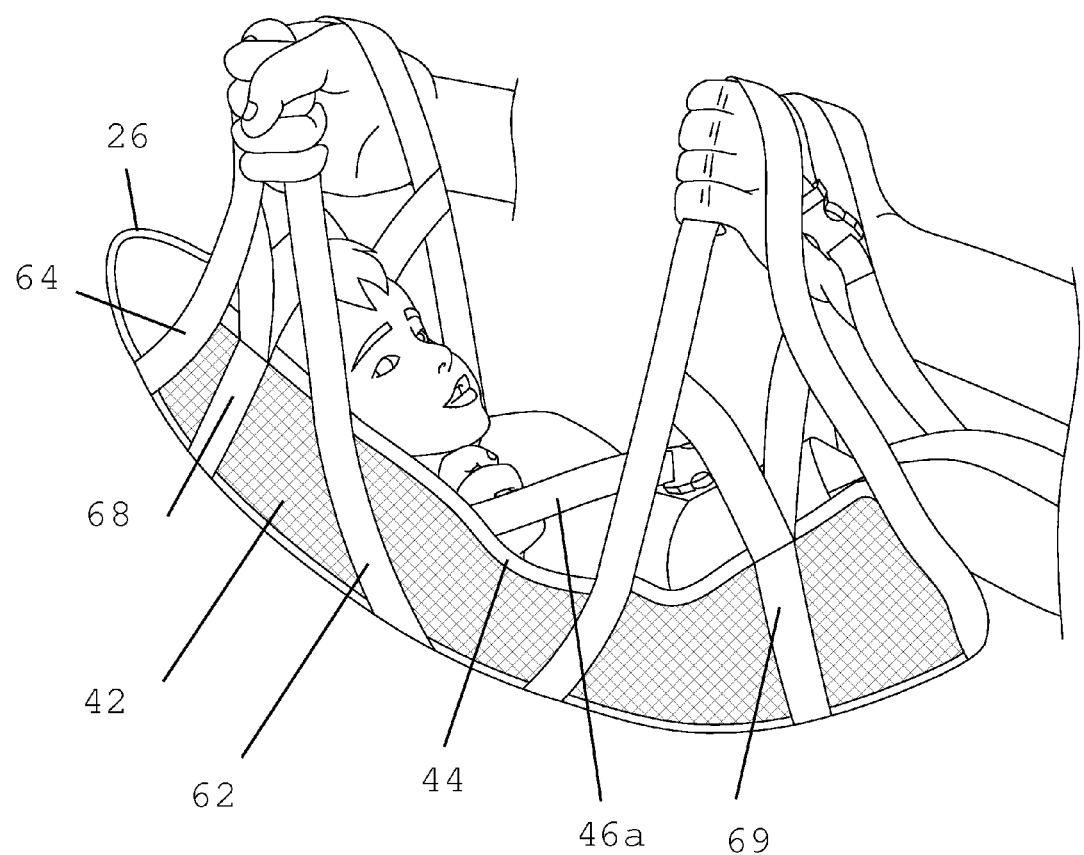
FIG. 3 illustrates an isometric view of the present invention wherein a user has joined top and bottom loops 64; 64a; 66; and 66a to transport a child. Enveloping flaps 42; 42a are seen stretched and enveloping the child.
Figure 4:
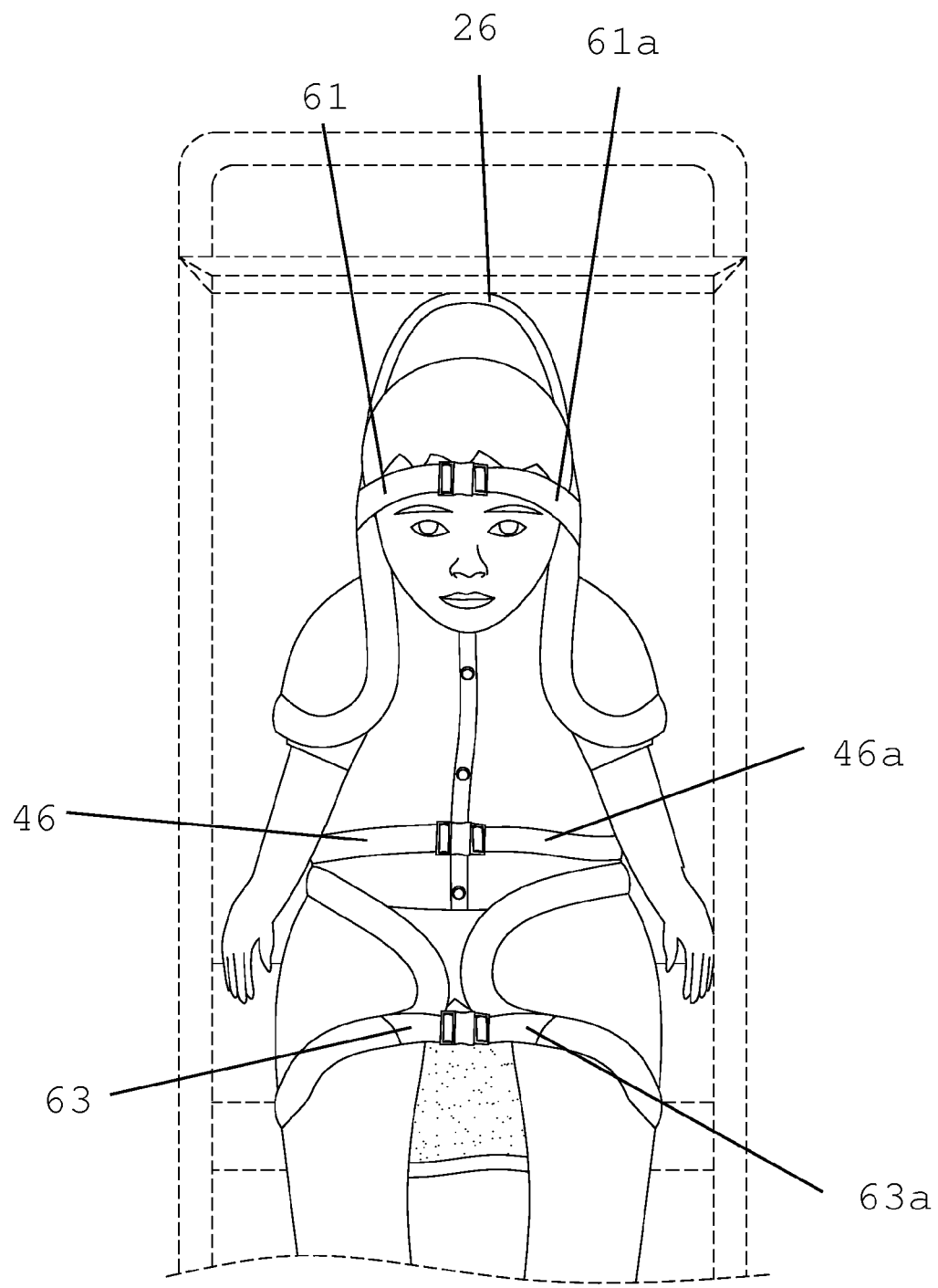

As seen in FIG. 2, when a child is to be transported top transportation restraining members 61; 61a can be cooperatively locked together to secure the child during transportation. Similarly, a child is secured before transportation from a stroller using top transportation restraining members 61; 61a. As shown in FIGS. 2-4, bottom transportation restraining members 63; 63a can be used to further secure the child during transportation. Top and bottom transportation restraining members 61; 61a; 63; and 63a each extend from a predetermined point on their respective loops to cooperate with its opposite restraining member thereby effectively securing a child.

Once secure, top loops 64; 64a are released from child car seat head support members S1 and S2, respectively, and brought together to serve as a carrying strap. Bottom loops 66; 66a are similarly joined together in transportation mode to allow a user to lift the child on the present invention using both hands as shown in FIG. 3. In an alternate embodiment, shown in FIG. 1A, top cushions 65; 65a and bottom cushions 67; 67a can be mounted to top loops 64; 64a and bottom loops 66; 66a, respectively, to make the transportation of a child more comfortable and providing better grip to a user.

Figure 5:
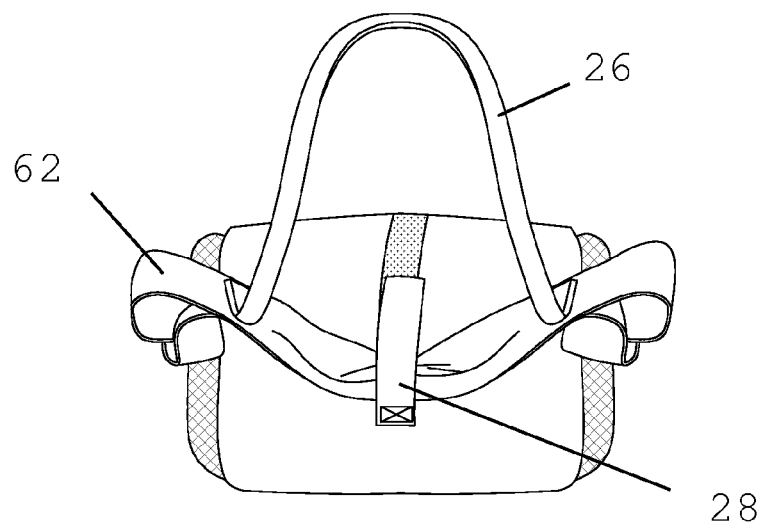
FIG. 5 is a front view of the present invention in its rolled, compact configuration using fastening member 28 securing continuous strap 62. Headrest mounting member 26 can be used to carry the present invention in this configuration.
Figure 6:
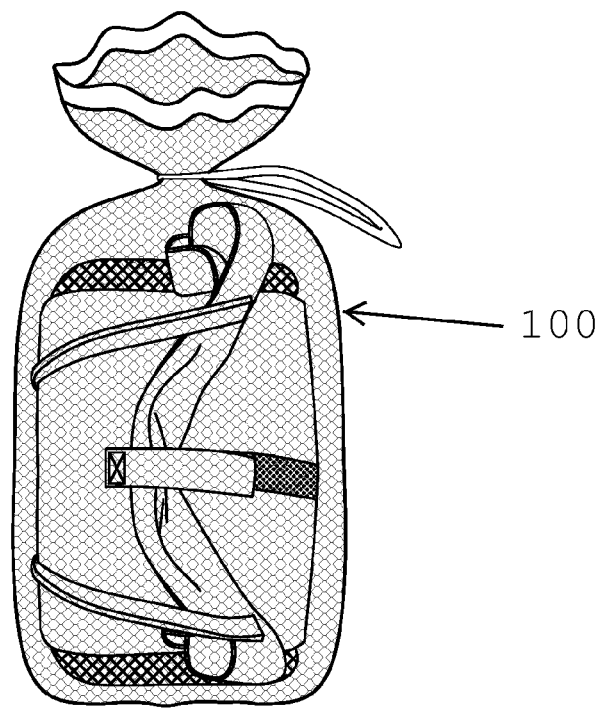
FIG. 6 is a front view of storage assembly 100 housing the present invention therein.

During transportation, as carrying strap assembly 60 is lifted elastic band members 68; 68a; 69; and 69a each stretch thereby raising enveloping flaps 42; 44 around a child thereby enhancing safety during transport, as seen in FIG. 3. When a user is finished using the present invention, it can be rolled into a compact configuration as shown in FIG. 5. The rear of pad assembly 20 includes fastening member 28 that can be a hook and loop fastener, sew-through button, or similar component. Continuous strap 62 is secured using fastening member 28 after the present invention is in its compact configuration. As seen in FIG. 6, storage assembly 100 can be used to ergonomically store and transport the present invention.

What is claimed is:

1. A child transportation device comprising:
a pad assembly, an enveloping assembly, and a carrying strap assembly, said pad assembly having a midpoint, a rear portion and upper portion, said pad assembly including a cushion member extending longitudinally thereon, said cushion member having a left and right side, said enveloping assembly having two enveloping flaps extending outwardly a predetermined distance from said left and right sides of said cushion member, said enveloping flaps each having a perimeter member running longitudinally down each enveloping flap member defining an outer edge, said enveloping flaps having a top portion and a bottom portion, said carrying strap assembly having a continuous strap mounted to the rear of said pad assembly and extending along the present invention in a figure eight configuration thereby creating two top loops at the top left and right sides of said enveloping flaps having a top and bottom portion and two bottom loops at the bottom left and right sides of said enveloping flaps having a top and bottom portion, said carrying strap assembly further including two top elastic band members having a first, second end and third end, said first end mounted at a predetermined point along said perimeter members, said second end and third end mounted to the top and bottom portion of said top loop, respectively, said carrying strap assembly further including two bottom elastic band members having a first, second end and third end, said first end mounted at a predetermined point along said perimeter members, said second end and third end mounted to the top and bottom portion of said bottom loop, respectively, said top loops cooperating when joined together to create carrying straps, said bottom loops cooperating with each other when joined together to create carrying straps, said elastic band members stretching as a load is lifted using said carrying straps thereby raising said enveloping flaps.

2. The transportation device of claim 1 further including a headrest mounting member extending from the rear, upper portion of said pad assembly to cooperatively mount to a vehicle's headrest.

3. The transportation device of claim 1 wherein said enveloping flaps are made of a flexible, mesh material.

4. The transportation device of claim 1 further including a seat belt buckle opening at a location on said cushion member that permits a seat belt buckle to pass through.

5. The transportation device of claim 1 wherein each top and bottom loop member includes a carrying strap cushion mounted thereon.

6. The transportation device of claim 5 wherein said carrying strap cushion includes illumination members.

7. The transportation device of claim 1 further including restraining members mounted along the midpoint of said pad assembly to said perimeter members to secure a child to said device.

8. The transportation device of claim 1 wherein said continuous strap is a segmented strap broken up into a predetermined plurality of smaller straps.

9. The transportation device of claim 1 further including male and female top restraining members mounted at opposite top loop members and male and female bottom restraining members mounted at opposite bottom loop members.

10. The transportation device of claim 1 made of a flexible material that can be rolled up into a compact configuration.

11. The transportation device of claim 9 wherein said pad assembly includes a front surface and a rear surface having a fastening means mounted to said rear surface to secure said continuous strap when the device is in the compact configuration.

12. The transportation device of claim 9 further including a storage assembly to house said device when in the rolled up configuration.

\* \* \* \* \*